(12) United States Patent
Wroblewski et al.

(10) Patent No.: US 12,509,935 B2
(45) Date of Patent: Dec. 30, 2025

(54) DEVICE FOR OPENING/CLOSING AN OPENING ELEMENT BY DETECTING MOVEMENT OF A USER'S LIMB, AND ASSOCIATED OPENING/CLOSING METHOD

(71) Applicant: VITESCO TECHNOLOGIES GMBH, Regensburg (DE)

(72) Inventors: Jérome Wroblewski, Toulouse (FR); Corinne Paret, Toulouse (FR); Xavier Hourne, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 312 days.

(21) Appl. No.: 18/010,793

(22) PCT Filed: Jun. 10, 2021

(86) PCT No.: PCT/EP2021/065656
§ 371 (c)(1),
(2) Date: Dec. 15, 2022

(87) PCT Pub. No.: WO2021/259661
PCT Pub. Date: Dec. 30, 2021

(65) Prior Publication Data
US 2023/0235611 A1 Jul. 27, 2023

(30) Foreign Application Priority Data
Jun. 23, 2020 (FR) ........................ 2006553

(51) Int. Cl.
*E05F 15/73* (2015.01)
*B60Q 1/00* (2006.01)
*H03K 17/96* (2006.01)

(52) U.S. Cl.
CPC ............ *E05F 15/73* (2015.01); *B60Q 1/0023* (2013.01); *H03K 17/962* (2013.01);
(Continued)

(58) Field of Classification Search
None
See application file for complete search history.

(56) References Cited

U.S. PATENT DOCUMENTS

| 2016/0112044 A1* | 4/2016 | Salter | H03K 17/955 |
| | | | 307/116 |
| 2017/0204650 A1* | 7/2017 | Dezorzi | E05F 15/77 |

(Continued)

FOREIGN PATENT DOCUMENTS

| CN | 2828763 Y | * 10/2006 |
| CN | 202143044 | 2/2012 |

(Continued)

OTHER PUBLICATIONS

Translation—WO2018096808A1_ (Year: 2018).*
(Continued)

*Primary Examiner* — Adam D Tissot
*Assistant Examiner* — Charles Pall
(74) *Attorney, Agent, or Firm* — NIXON & VANDERHYE

(57) ABSTRACT

Disclosed is a device for opening/closing an opening element of a motor vehicle by detecting movement of a users limb, the device including an approach and/or contact detection sensor including a single electrode and an analyzer for analyzing the variations in capacitance of the electrode, and an opening element opening/closing control unit. The device also includes: a sealed housing including first and second metal surfaces; and a unit for detecting a predetermined form of the variations of the electrode, exhibiting a succession of a predetermined number of peaks of predetermined amplitude within a predetermined period; the first and second surface being separate, and the electrode being located outside the sealed housing, in such a way that the electrode is coupled electrically to the at least one first
(Continued)

surface and to the at least one second surface so as to create at least two approach and/or contact detection areas.

20 Claims, 5 Drawing Sheets

(52) U.S. Cl.
CPC ....... *E05Y 2400/45* (2013.01); *E05Y 2400/86* (2013.01); *E05Y 2600/41* (2013.01); *E05Y 2900/546* (2013.01); *E05Y 2900/548* (2013.01); *H03K 2217/960755* (2013.01)

(56) References Cited

U.S. PATENT DOCUMENTS

| | | |
|---|---|---|
| 2017/0241186 A1 | 8/2017 | Koda |
| 2017/0241187 A1 | 8/2017 | Takayanagi |
| 2018/0163440 A1 | 6/2018 | Ishihara et al. |
| 2019/0120456 A1 * | 4/2019 | Noda ................ F21S 41/28 |
| 2019/0267993 A1 | 8/2019 | Sawada |

FOREIGN PATENT DOCUMENTS

| | | | | |
|---|---|---|---|---|
| CN | 209196615 U | * | 8/2019 | ............... B60Q 3/85 |
| DE | 102008025057 A1 | * | 12/2009 | ............... B60Q 3/80 |
| DE | 10 2014 015 899 | | 5/2015 | |
| EP | 2 947 773 | | 11/2015 | |
| FR | 2 990 905 | | 11/2013 | |
| WO | 2012/052210 | | 4/2012 | |
| WO | 2012/095157 | | 7/2012 | |
| WO | 2014/199235 | | 12/2014 | |
| WO | 2015/110239 | | 7/2015 | |
| WO | WO-2018096808 A1 | * | 5/2018 | ............ E05F 15/611 |

OTHER PUBLICATIONS

Translation of DE 102008025057 A1 (Year: 2009).*
English translation for CN-2828763-Y (Year: 2025).*
English Translation of CN-209196615-U (Year: 2025).*
International Search Report for PCT/EP2021/065656 dated Oct. 19, 2021, 6 pages.
Written Opinion of the ISA for PCT/EP2021/065656 dated Oct. 19, 2021, 7 pages.

* cited by examiner

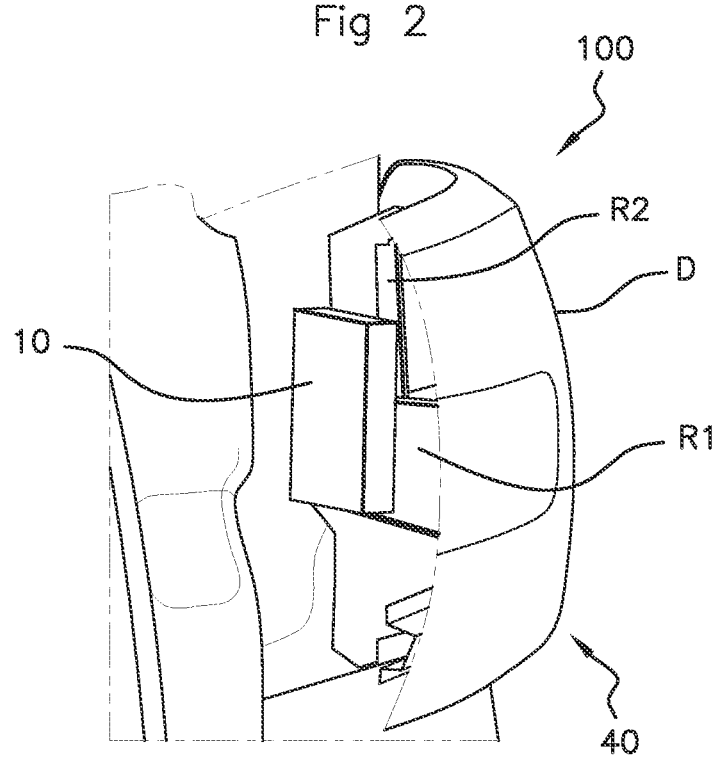
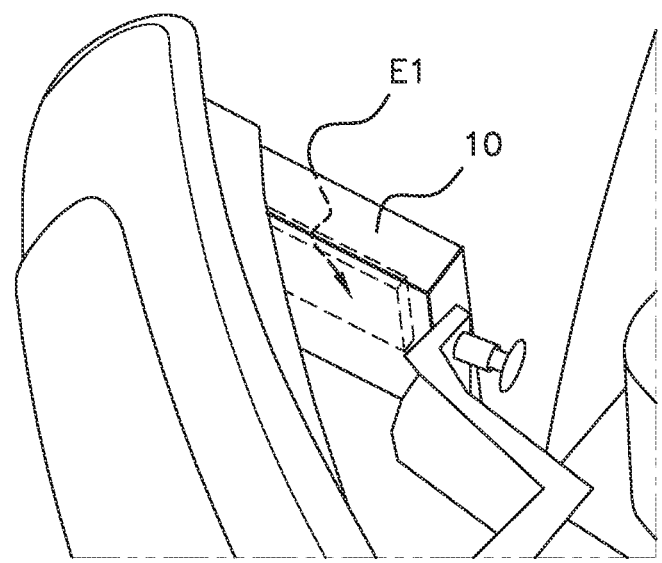

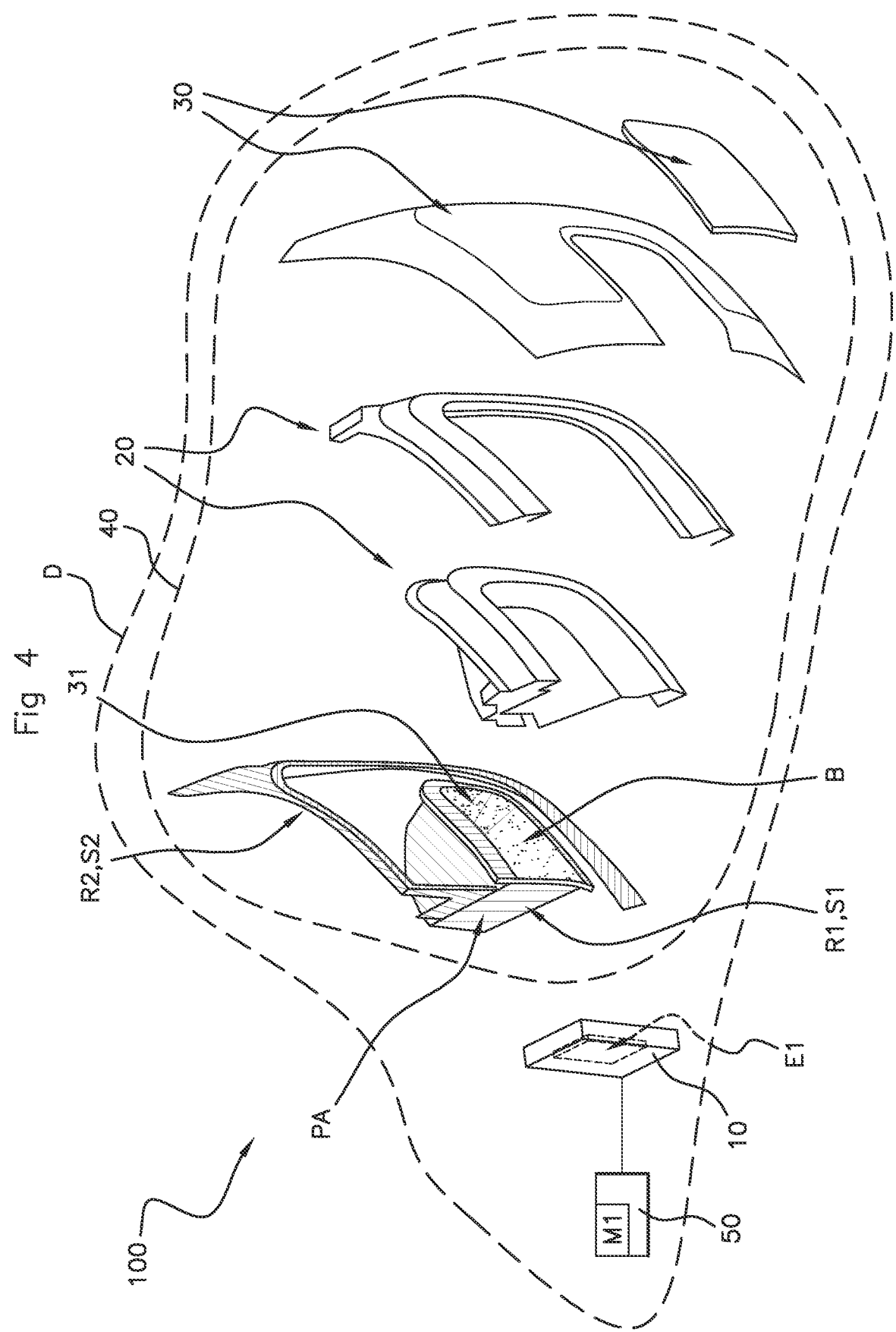

DEVICE FOR OPENING/CLOSING AN OPENING ELEMENT BY DETECTING MOVEMENT OF A USER'S LIMB, AND ASSOCIATED OPENING/CLOSING METHOD

CROSS-REFERENCE TO RELATED APPLICATION(S)

This application is the U.S. national phase of International Application No. PCT/EP2021/065656 filed Jun. 10, 2021 which designated the U.S. and claims priority to FR 2006553 filed Jun. 23, 2020, the entire contents of each of which are hereby incorporated by reference.

BACKGROUND OF THE INVENTION

Field of the Invention

The invention relates to a device for opening/closing an opening element by detecting movement of a users limb, and to an associated opening/closing method providing secure hands-free access.

Description of the Related Art

The main, but non-exclusive, application of this invention concerns the opening of vehicle trunks, with the purpose of enabling an authorized user to open a trunk simply by a movement of a limb of the user, the user being identified by a badge or a key carried by him, using a BCM ("body control module") located in the vehicle.

Up to the present, requests for hands-free access have mainly involved a requirement to position a hand in order to confirm a request to open/close an opening element of a vehicle (such as a door), and this process includes two main steps, namely the recognition by the BCM of the access system of a key or a badge authorized to open or close the vehicle in the proximity of the opening element, and, in the case of a request for opening, the detection of the presence of a hand on a handle.

The implementation of this method requires antennas for detecting authorized keys or badges, presence sensors, usually capacitive sensors, in the handles for detecting a hand, and a centralized system for managing hands-free access requests, this system being, for example, a computer partly or wholly dedicated to this function.

Regarding the use of a foot for contactless opening, a known application relates to the opening of an operating theatre door by hospital personnel. For example, the utility model CN 202,143,044 proposes fitting the door with an induction sensor for detecting a foot. Persons wishing to enter or exit the theatre extend their foot near the sensor and the signal detected by the sensor is transmitted to a control device of a door opening/closing mechanism.

A use of the foot for hands-free access to a vehicle trunk is described in the international application WO 2012/052210. This document proposes the detection of a typical movement, for example a back and forth movement of part of the users body, for example the foot, by a capacitive detection assembly with two elongate electrodes. These electrodes extend horizontally under the trunk, with the longer one below the shorter one, and are coupled to a control and evaluation device. Variations in capacitance are monitored with respect to a reference potential, and, if the typical movement is within the detection interval, an activation such as the opening of the trunk is triggered.

The typical movement is a back and forth movement of the lower part of the users leg. To perform this typical movement, the user must therefore raise his leg to make his foot or his shin pass across the electrodes. Consequently, this movement is not risk-free, especially if the user is carrying objects, is elderly, or is wearing high heels. The raising of the leg may cause a loss of balance, which may be exacerbated if the ground is slippery (due to ice, for example).

Moreover, some vehicles of the pick-up type, that is to say light utility vehicles having a cargo area or an open space at the rear, or SUVs (sports utility vehicles), suitable for off-road use, are higher than private cars, and their fenders are located higher above the ground, thus making the performance of the typical movement risky or even dangerous.

Consequently there is a need to design a device for opening/closing an opening element by detecting a movement of a users limb, and an associated opening/closing method providing secure hands-free access, which is not dangerous for the user and which is compatible with any type of vehicle.

SUMMARY OF THE INVENTION

The invention relates to a device for opening/closing an opening element of a motor vehicle by detecting a movement of a users limb, said device comprising an approach and/or contact detection sensor comprising a single electrode and analysis means for analyzing said variations in capacitance of the electrode, and an opening element opening/closing control unit, said device being noteworthy in that it also comprises:
 a. a sealed housing comprising at least one first metal surface and at least one second metal surface,
 b. detection means for detecting a predetermined form of said variations of the electrode, exhibiting a succession of a predetermined number of peaks of predetermined amplitude within a predetermined period,
 the at least one first surface and the at least one second surface being separate, and said electrode being located outside the sealed housing, in such a way that said electrode is coupled electrically to the at least one first surface and to the at least one second surface so as to create at least two approach and/or contact detection areas.

Preferably, the sealed housing comprises a reflector and lamps, and the first metal surface takes the form of parts of the reflector.

Advantageously, the sealed housing comprises a decorative part and the second surface takes the form of the decorative part.

The decorative part may be located at least partially around the reflector.

In one preferred embodiment, the predetermined movement is a back and forth movement across the device, and the predetermined number of peaks is four.

The invention is also applicable to a motor vehicle lamp and to a motor vehicle comprising the device according to any of the previously listed characteristics.

The invention also relates to a method for opening/closing an opening element of a motor vehicle by detecting a movement of a users limb, using an opening/closing device comprising an approach and/or contact detection sensor comprising a single electrode and analysis means for analyzing said variations in capacitance of the electrode, and an opening element opening/closing control unit, said method being noteworthy in that the device is equipped in advance with:

a. a sealed housing comprising at least one first metal surface and at least one second metal surface,
b. detection means for detecting a predetermined form of said variations of the electrode, exhibiting a succession of a predetermined number of peaks of predetermined amplitude within a predetermined period, the at least one first surface and the at least one second surface being separate, said electrode being located outside the sealed housing, in such a way that said electrode is coupled electrically to the at least one first surface and to the at least one second surface so as to create at least two approach and/or contact detection areas, and in that said method comprises the following steps:

c. detecting a predetermined form of said variations of the electrode, exhibiting a succession of a predetermined number of peaks of predetermined amplitude within a predetermined period,
d. opening/closing the opening element according to the detection thus performed.

Preferably, the predetermined movement is a back and forth movement across the device (D), and the predetermined number of peaks is four.

BRIEF DESCRIPTION OF THE DRAWINGS

Other characteristics and advantages of the invention will become clear in the light of the following description. This description is purely illustrative and should be read in conjunction with the appended drawings, in which:

FIG. 2 shows a sectional view from the left of a right tail lamp 100 of a vehicle comprising the opening/closing device D according to the invention, FIG. 3 shows a top view from the right of a right tail lamp 100 of a vehicle comprising the opening/closing device D according to the invention, FIG. 4 shows an exploded view of the views of FIGS. 2 and 3.

DESCRIPTION OF THE PREFERRED EMBODIMENTS

Figure 1:
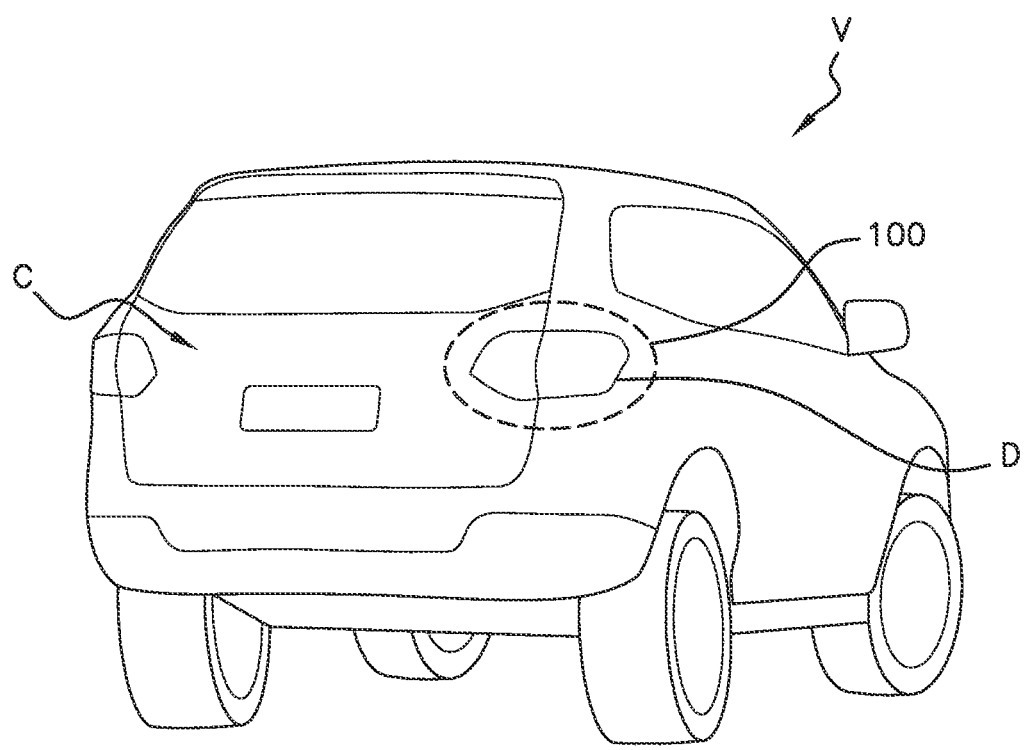
FIG. 1 shows schematically a vehicle V comprising an opening/closing device for an opening element according to the invention.

FIG. 1 shows a motor vehicle V comprising an opening/closing device D for an opening element of the vehicle V according to the invention. In the illustrated example, what is described is the opening/closing without physical contact, that is to say in a "hands free" manner, of a trunk C of the vehicle. In this example, the device D is contained in a right tail lamp 100 of the vehicle V.

As mentioned above, the aim of the invention is to enable the user to open the trunk C of his vehicle without physical contact and without the drawbacks (such as the risk of falls) of the prior art.

To this end, the invention proposes the device D shown in FIGS. 2, 3, 4 and 5a, 5b. FIG. 2 shows a sectional view from the left of the right tail lamp 100 of the vehicle V.

The right tail lamp 100 consists of a sealed housing 40 (see FIG. 5b) connected by a wiring harness (not shown) to an electronic module for controlling and managing the vehicle lights, the sealed housing 40 being made of plastic material for example, and comprising, but not limited to, a. a casing B comprising one or more lamps, usually one or more LED (light-emitting diode) lamps, which must be protected from moisture, together with a first reflector R1 forming the inner walls of the casing,
b. a first glazed element 31 forming a wall of the casing,
c. a decorative part R2 (see FIG. 4) made of metal or chrome plated plastic, surrounding all or part of the casing B,
d. a plurality of successive light guides 20 made of plastic, nested within each other, and adapted for concentrating and/or diffusing and/or orienting the light beams from the lamps,
e. transparent plastic glazed elements which may or may not be colored.

The reflector R1 usually takes the form of a coating, with a high refractive index for light, on the inner walls of the casing B. The light projected by the lamp(s) is reflected by the walls of the reflector R1 of the casing B, then passes through the succession of transparent glazed elements (see FIG. 4), that is to say through the first glazed element 31 and then through the transparent glazed elements 30 and the light guides 20, so that the light from the lamps is guided in accordance with the driver-controlled lights that are switched on, these lights being rear lights, flashing lights, or others. The reflector R1 is a metal or plastic reflector comprising a metallic coating, made of chrome-plated plastic for example.

The decorative part R2 can be seen by the user from the outside, through one of the transparent glazed elements 30, and forms an ornamental feature of the lamp 100.

The device D comprises a proximity sensor 10, comprising one electrode, namely the single electrode E1 (see FIG. 4), together with the sealed housing 40 comprising at least two metal surfaces S1, S2 that are separate, that is to say not electrically connected or coupled to each other, and an electronic controller 50 (shown in FIG. 4).

The proximity sensor 10 takes the form of a housing comprising a capacitive approach and/or contact detection sensor in the form of the electrode E1, connected to an electronic circuit for measuring the capacitance at the terminals of the electrode E1. The sensor 10 is also electrically connected to the control unit 50, which is itself connected to the mechanism (not shown) for opening/closing the trunk C. The sensor 10 measures the variations of capacitance $\Delta Ce$ of the electrode E1 and transmits said variations to the control unit 50, which comprises means for analyzing said variations and which then sends an opening/closing signal to the mechanism of the trunk C, based on the variations of capacitance thus received.

The means for analyzing said variations of the capacitance of the electrode E1 take the form of means M1 for detecting a predetermined form of said variations, exhibiting a succession of a predetermined number of peaks of predetermined amplitude within a predetermined period, as explained below.

In our example, explained below, the predetermined number of peaks is 4, but this is in no way limiting.

The electrode E1 consists of a metal surface, made of copper for example. According to the invention, the sensor 10 comprising the electrode E1 is located outside the sealed housing 40, against or near an outer wall PA (see FIG. 4) of the housing 40, so that said electrode E1 is coupled electrically to the metallic surface of the reflector R1, located inside the housing 40, which will be referred to as the first metallic surface S1.

According to the invention, and in an ingenious manner, the electrode E1 is also located in contact with, or near, the decorative part R2, so as to be coupled electrically to said part, which will be referred to as the second metallic surface S2. This is illustrated in FIG. 5.

Thus, as shown in FIG. 5, the electrode E1, positioned in this way outside the sealed housing 40 of the right tail lamp 100, is then coupled electrically to the first metallic surface S1 and to the second metallic surface S2; that is to say, said electrode E1 is coupled electrically to the two surfaces made of metal or of metallized or chrome plated plastic.

Figure 5A:
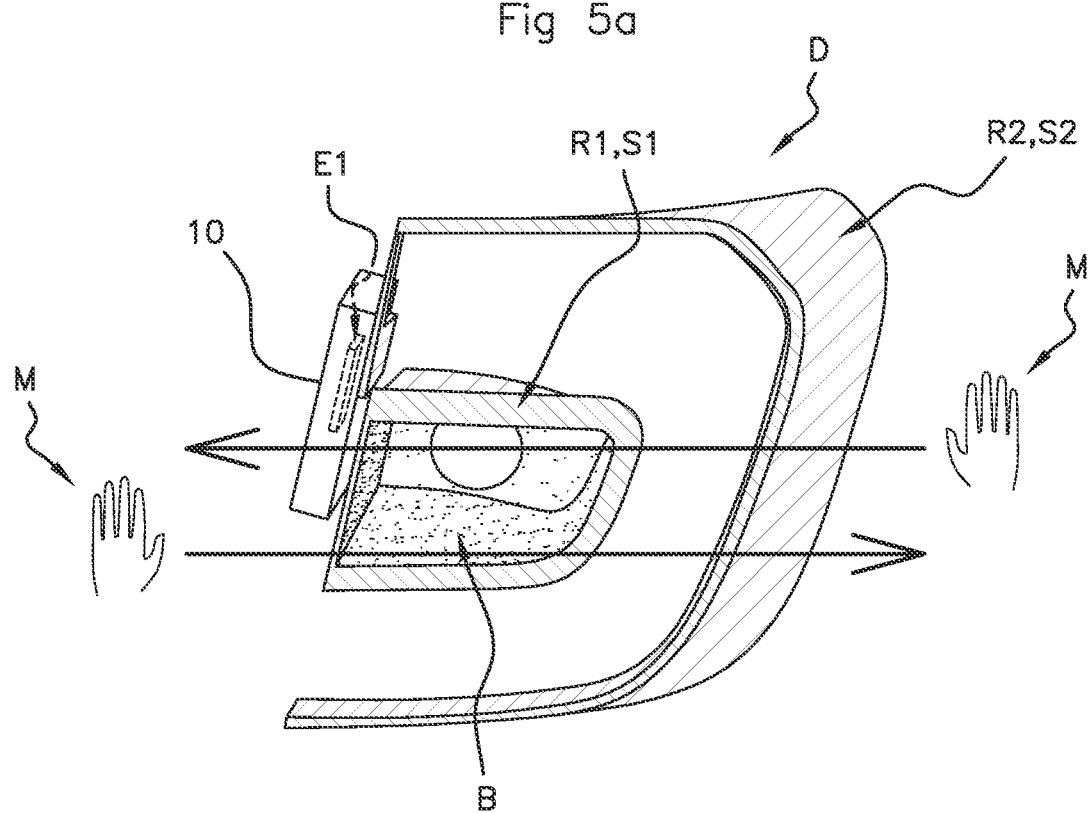
FIG. 5a shows a first front view of the device D according to the invention.
Figure 5B:
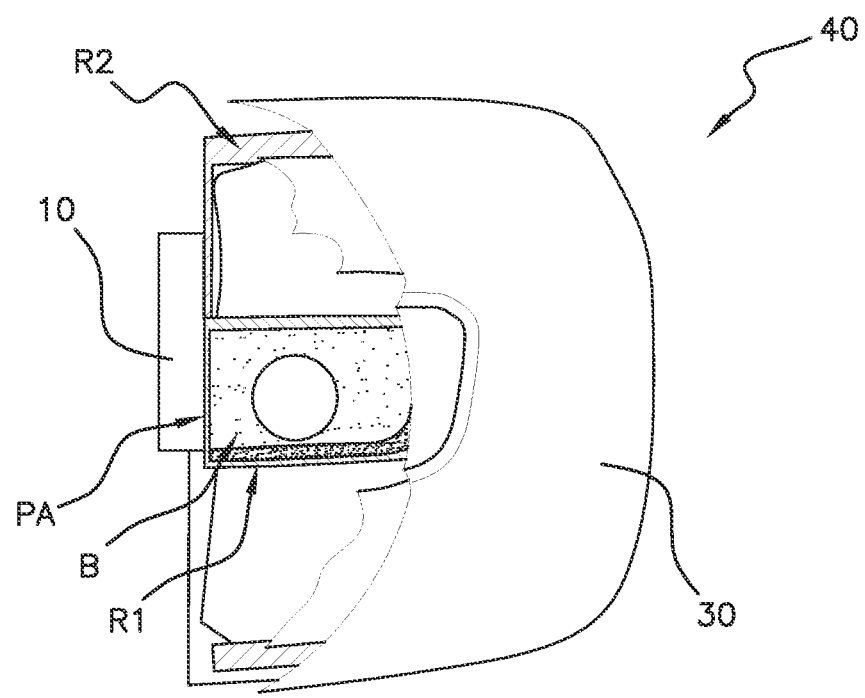
FIG. 5b shows a second front view of the device D according to the invention.
Figure 6:
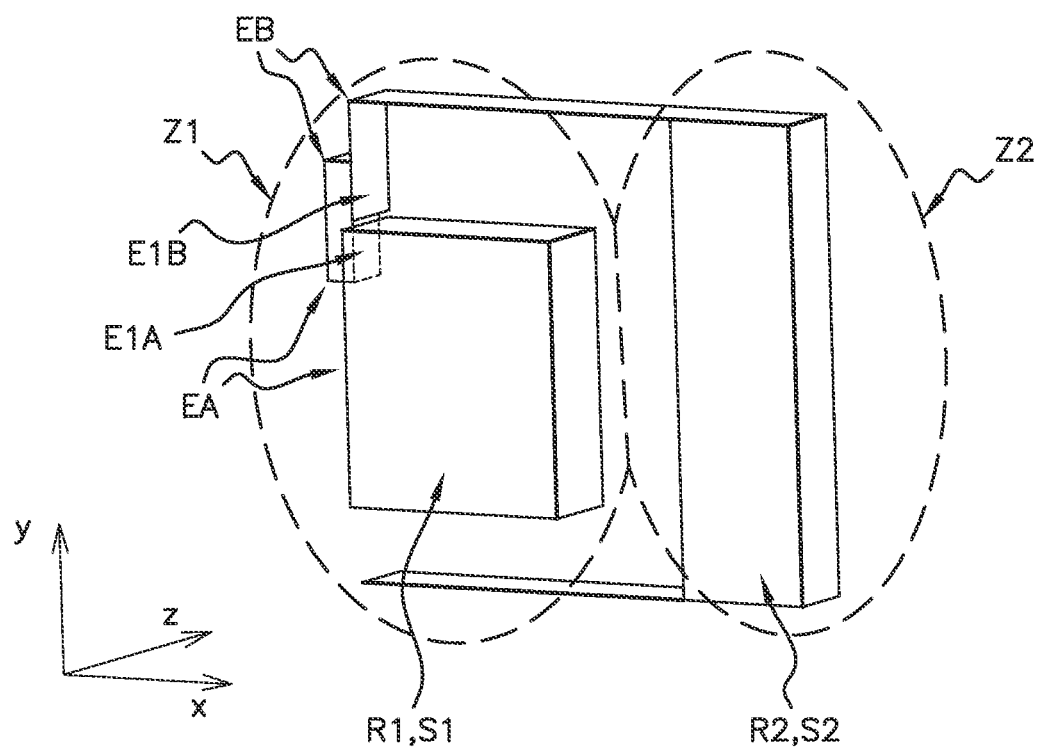
FIG. 6 is a schematic illustration of the device D together with the two capacitive detection areas.

FIG. 6 is a schematic view of FIG. 5. The part E1A of the electrode E1 that is coupled electrically to the first metallic surface S1 creates an electrode EA defined by the metallic surfaces formed by the part E1A of said electrode E1 and by the first metallic surface S1, thus forming a first approach and/or contact detection area Z1 around said reflector R1.

The part of the electrode E1B that is coupled electrically to the second metallic surface S2 creates an electrode EB defined by the metallic surfaces formed by the part E1B of said electrode E1 and by the second metallic surface S2, thus forming a second approach and/or contact detection area Z2 around the decorative part R2.

It should be noted that the single electrode E1 may take the form of two or more metallic parts that are electrically interconnected, a first part of the electrode being coupled electrically to the first metallic surface S1 and a second part of the electrode being coupled electrically to the second metallic surface S2.

It should be noted that the invention is not limited to two detection areas, and the electrode E1 may thus consist of a plurality of parts of the same single electrode that are electrically interconnected, each part being electrically connected to one or more metallic parts of the lamp 100, thus creating a plurality of detection areas.

The geometry of the two detection areas Z1, Z2 depends on, among other factors, the geometry of the two metallic surfaces S1, S2 coupled to the electrode E1, that is to say, among other factors, the geometry of the electrodes EA and EB, that is to say the geometry of the first and second metallic surfaces S1, S2.

Since the reflector R1 and the decorative part R2 have different geometries, the first and second metallic surfaces also have different geometries, resulting the creation of two detection areas Z1, Z2 which also have different geometries.

The geometry of a detection area is taken to be the dimensions of said area in three mutually orthogonal axes X, Y, Z, shown in FIG. 6.

Since the first and second metallic surfaces S1, S2 are not coupled electrically to each other, being separate for example, the electrodes E1 and EB each generate a detection area, that is to say they generate the two detection areas Z1, Z2. Said two detection areas Z1, Z2 may be separate and may not intersect each other, that is to say they may not have a common detection area, but it is also possible for them to have an intersection area, that is to say a common detection area.

The method of opening/closing the trunk C will now be explained with the aid of FIGS. 5a, 6 and 7.

When the user performs a predetermined movement, for example by moving his hand M back and forth across the opening/closing device D, as shown in FIG. 5 (the arrows pointing from left to right and right to left), said hand M passes consecutively into the detection areas Z2, Z1 and then Z1, Z2.

The presence of the hand is then detected consecutively by the two electrodes EB, EA, then EA, EB, causing a variation in the capacitance seen by the electrode E1.

Figure 7:
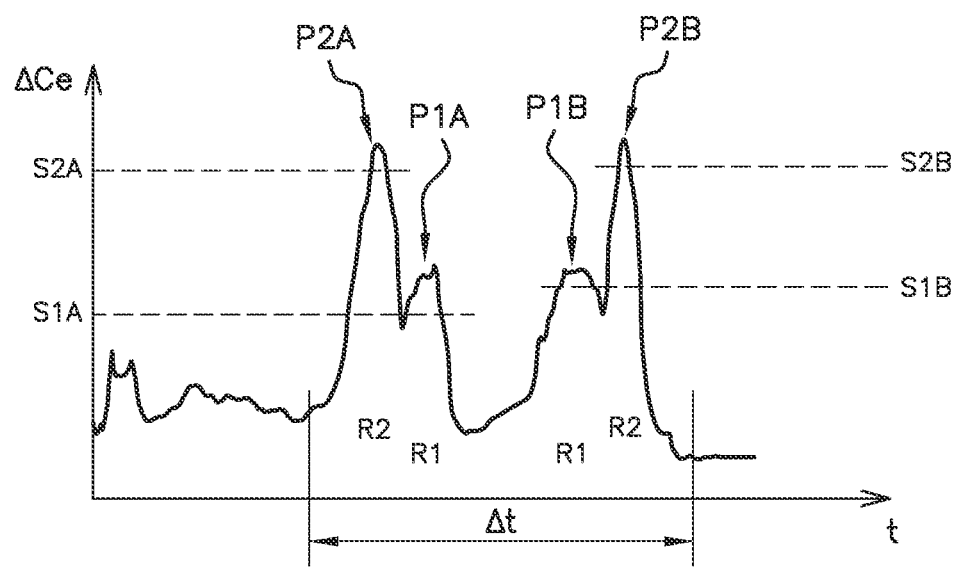
FIG. 7 is a graph showing the variation of capacitance at the terminals of the electrode when a users hand passes across the tail lamp.

This variation of capacitance $\Delta Ce$ as a function of time t is shown in FIG. 7. The back and forth movement of the users hand M is characterized by a specific variation curve of the capacitance of the electrode E1, that is to say a curve exhibiting a predetermined form over a predetermined period $\Delta t$, and comprising:

a. two first peaks P2A, P1A, corresponding to the first passage (forward movement of the hand M from right to left) across the lamp 100, that is to say a passage across the second part R2, in other words in the second detection area Z2, then across the first reflector R1, that is to say in the first detection area Z1, b. two second peaks P1B, P2B, corresponding to the second passage (return movement of the hand M from left to right) across the first reflector R1, that is to say in the first detection area Z1, then across the second reflector R2, that is to say in the second detection area Z2.

The variation peaks P1A, P1B of the capacitance of the electrode E1 correspond to the passage of the hand M across the reflector R1. The peaks of variation P2A, P2B of the capacitance of the electrode E1 correspond to the passage of the hand M across the decorative part R2. The amplitude of the peaks P1A, P1B, P2A, P2B depends on the geometry of the detection areas metallic surfaces Z1, Z2, and therefore on the dimensions of the first and second metallic surfaces S1, S2.

In our example, the predetermined form of the variations of the electrode E1 comprises 4 peaks, corresponding to two passages across each of the two elements, namely the reflector R1 and the decorative part R2, according to the predetermined movement of the users hand M.

Evidently, the invention is not limited to a back and forth movement of the users hand M across the opening/closing device D, but is also applicable to any movement of a party of the users body across the opening/closing device D allowing a successive passage from the first Z1 or the second detection area Z2, respectively, to the second Z2 or the first detection area Z1, and allowing the creation of a range of variation of capacitance $\Delta Ce$ which may be compared with a predetermined form.

The invention is therefore ingenious in that enables the trunk of the vehicle to be opened in a "hands free" manner without the need to lift a lower limb from the ground. The invention is all the more remarkable in that it obviates the problems of sealing the lamp housing, by placing the electrode outside said sealed housing 40 rather than inside it. This is because placing the electrode inside the sealed housing 40 of the lamp has the disadvantage of requiring the passage of wires from inside the sealed housing 40 to the outside, these wires connecting the electrode E1 to the sensor 10 which is located outside the housing 40.

With the arrangement of the electrode E1 according to the invention, no intrusive changes are made to the housing 40, which remains completely sealed.

Furthermore, the invention enables two detection areas to be created in a skillful manner, by appropriate use of the metallic surfaces available in the lamp. Thus a single electrode enables at least two detection areas to be generated, by contrast with the prior art in which two electrodes are required to create two areas and make the detection robust.

The device according to the invention, for its part, enables robust and reliable detection to be provided using a single electrode, without intrusive modification of a part of the vehicle that must remain sealed.

The invention claimed is:

1. A device for opening/closing an opening element of a motor vehicle by detecting movement of a limb of a user, said device comprising:
   an approach and/or contact detection sensor comprising a single electrode, and
      one or more processors configured to analyze variations in capacitance of the single electrode;
   an opening element opening/closing electronic controller;
   a sealed housing comprising at least one first metal surface and at least one second metal surface, the at least one first metal surface and the at least one second metal surface being separate, the at least one first metal surface being disposed inside the sealed housing; and
   a detector configured to detect a predetermined form of said variations of the single electrode, exhibiting a succession of a predetermined number of peaks of predetermined amplitude within a predetermined period,
   wherein said single electrode is located outside the sealed housing such that said single electrode is respectively coupled electrically to the: least one first surface disposed inside the sealed housing and the at least one second surface to create at least two separate approach and/or contact detection areas.

2. The device as claimed in claim 1, wherein the sealed housing comprises a reflector and lamps, and
   wherein the first metal surface takes the form of parts of the reflector.

3. The device as claimed in claim 1, wherein the sealed housing comprises a decorative part, and
   wherein the second surface takes the form of the decorative part.

4. The device as claimed in claim 3, wherein the decorative part is located at least partially around the reflector.

5. The device as claimed in claim 1, wherein the movement is a back-and-forth movement across the device, and
   wherein the predetermined number of peaks is four.

6. A lamp for a motor vehicle comprising the device as claimed in claim 1.

7. A motor vehicle comprising the device as claimed in claim 1.

8. A method for opening/closing an opening element of a motor vehicle by detecting movement of a limb of a user, using an opening/closing device including an approach and/or contact detection sensor including a single electrode and one or more processors configured to analyze variations in capacitance of the single electrode, and an opening element opening/closing controller, said opening/closing device including a sealed housing including at least one first metal surface and at least one second metal surface, the at least one first metal surface and the at least one second metal surface being separate, the at least one first metal surface being disposed inside the sealed housing, and a detector configured to detect a predetermined form of said variations a of the single electrode, exhibiting succession of a predetermined number of peaks of predetermined amplitude within a predetermined period, said single electrode being located outside the sealing housing such that said single electrode is respectively coupled electrically to the at least one first surface disposed inside the sealing housing and to the at least one second surface to create at least two separate approach and/or contact detection areas, said method comprising:
   detecting a predetermined form of said variations of the single electrode, exhibiting a succession of a predetermined number of peaks of predetermined amplitude within a predetermined period when the single electrode is respectively coupled electrically to the at least one first surface disposed inside the sealed housing and to the at least one second surface to create the at least two separate approach and/or contact detection areas; and
   opening/closing the opening element according to the detected predetermined form of the variations of the single electrode.

9. The method as claimed in claim 8, wherein the movement is a back-and-forth movement across the device, and
   wherein the predetermined number of peaks is four.

10. The device as claimed in claim 2, wherein the sealed housing comprises a decorative part, and
   wherein the second surface takes the form of the decorative part.

11. The device as claimed in claim 2, wherein the movement is a back-and-forth movement across the device, and
   wherein the predetermined number of peaks is four.

12. The device as claimed in claim 3, wherein the movement is a back-and-forth movement across the device, and
   wherein the predetermined number of peaks is four.

13. The device as claimed in claim 4, wherein the movement is a back-and-forth movement across the device, and
   wherein the predetermined number of peaks is four.

14. A lamp for a motor vehicle comprising the device as claimed in claim 2.

15. A lamp for a motor vehicle comprising the device as claimed in claim 3.

16. A lamp for a motor vehicle comprising the device as claimed in claim 4.

17. A lamp for a motor vehicle comprising the device as claimed in claim 5.

18. A motor vehicle comprising the device of claim 2.

19. The device as claimed in claim 1, wherein a first part of the single electrode that is coupled electrically to the at least one first metal surface creates a first approach and/or contact detection electrode defined by the first part of the single electrode and the at least one first metal surface to form a first approach and/or contact detection area of the at least two approach and/or contact detection areas, and a second part of the single electrode that is coupled electrically to the at least one second metal surface creates a second approach and/or contact detection electrode defined by the second part of the single electrode and the at least one second metal surface to form a second approach and/or contact detection area of the at least two approach and/or contact detection areas.

20. The method as claimed in claim 8, wherein a first part of the single electrode is coupled electrically to the at least one first metal surface to create a first approach and/or contact detection electrode defined by the first part of the single electrode and the at least one first metal surface to form a first approach and/or contact detection area of the at least two approach and/or contact detection areas, and a second part of the single electrode is coupled electrically to the at least one second metal surface to create a second approach and/or contact detection electrode defined by the second part of the single electrode and the at least one second metal surface to form a second approach and/or contact detection area of the at least two approach and/or contact detection areas.

\* \* \* \* \*